US011634219B2

(12) United States Patent
Rowse et al.

(10) Patent No.: US 11,634,219 B2
(45) Date of Patent: Apr. 25, 2023

(54) STACKABLE SWARMING DRONES HAVING A MATING RECESS STRUCTURE

(71) Applicant: Hex Technology Limited, Hong Kong (HK)

(72) Inventors: Philip Jonathan Rowse, Moolap (AU); Chengjun Wu, Xiamen (CN)

(73) Assignee: Hex Technology Limited, Hong Kong (HK)

( * ) Notice: Subject to any disclaimer, the term of this patent is extended or adjusted under 35 U.S.C. 154(b) by 274 days.

(21) Appl. No.: 17/084,570

(22) Filed: Oct. 29, 2020

(65) Prior Publication Data

US 2022/0041279 A1 Feb. 10, 2022

(30) Foreign Application Priority Data

Aug. 4, 2020 (CN) .......................... 202021593380.1

(51) Int. Cl.
| | |
|---|---|
| *B64C 37/02* | (2006.01) |
| *B64C 1/00* | (2006.01) |
| *G05D 1/10* | (2006.01) |
| *B64C 39/02* | (2023.01) |
| *B64U 30/20* | (2023.01) |

(52) U.S. Cl.
CPC ................ *B64C 37/02* (2013.01); *B64C 1/00* (2013.01); *B64C 39/024* (2013.01); *G05D 1/104* (2013.01); *B64C 2001/0045* (2013.01); *B64C 2211/00* (2013.01); *B64U 30/20* (2023.01); *B64U 2201/102* (2023.01)

(58) Field of Classification Search
CPC ................ B64C 1/00; B64C 2201/143; B64C 2201/108; G05D 1/104
See application file for complete search history.

(56) References Cited

U.S. PATENT DOCUMENTS

| | | | | |
|---|---|---|---|---|
| 4,854,526 A | * | 8/1989 | Rochefort | ................ B64G 1/10 244/172.7 |
| 9,957,045 B1 | * | 5/2018 | Daly | ....................... B64C 37/02 |
| 10,800,524 B2 | * | 10/2020 | Benezra | ................... B64F 1/222 |
| 11,190,032 B2 | * | 11/2021 | Farrahi Moghaddam | ................... B60L 53/14 |
| 11,383,835 B2 | * | 7/2022 | Hörtner | ................... G05D 1/104 |
| 2019/0276147 A1 | * | 9/2019 | Lee | ............. E01F 3/00 |
| 2020/0247558 A1 | * | 8/2020 | Tian | ....................... B64F 1/007 |

* cited by examiner

*Primary Examiner* — Brady W Frazier
(74) *Attorney, Agent, or Firm* — Idea Intellectual Limited; Margaret A. Burke; Sam T. Yip

(57) ABSTRACT

The present invention provides a stackable drone and a drone swarm comprising at least two stackable drones. Each drone comprising: a fuselage comprising a first end and a second end; a mating structure arranged in the fuselage and configured to have an opening at the first end of the fuselage, the mating structure forming a mating recess on a first side of the fuselage, the mating recess having an opening at the first side of the fuselage for receiving a mating projection from a further stacking unmanned aerial vehicle. The stackable drones do not require a large area of ground for take-off and landing, require only a small space for storage and transportation. When landing, based on the conical or pyramidal structure, the drone may slide down by gravitational force into the mating recess of another drone thereunder without needs of high precision positioning or alignment system.

16 Claims, 6 Drawing Sheets

STACKABLE SWARMING DRONES HAVING A MATING RECESS STRUCTURE

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATIONS

This application claims priority to the Chinese patent application No. 202021593380.1 filed on Aug. 4, 2020, and the disclosure of which is incorporated herein by reference in its entirety.

FIELD OF THE INVENTION

This invention relates to the field of unmanned aerial vehicle (UAV, commonly known as drone), in particular to stackable drones, a method and a system for arranging drone swarm.

BACKGROUND OF THE INVENTION

Unmanned aerial vehicle is an unmanned aircraft operated with radio remote control and built-in programmed controller unit. Based on the flying platform configuration, UAVs can be divided into fixed wing UAVs, rotary-wing UAVs, unmanned airships, para-wing UAVs, flapping-wing UAVs, etc. Drone swarm are now widely used in performance or shows. At present, when many drones take off and land simultaneously, it is necessary to keep each drone from the surrounding drones for a certain distance to ensure that they do not collide with each other during takeoff. Therefore, drone swarm usually occupy a large area of ground for take-off and landing. At the same time, it is required a lot of manual labor to place or retrieve the drones before and after take-off, and put them back in the storage boxes. Moreover, as existing drones are not designed to be stackable, each drone must occupy a certain volume for storage, resulting in a waste of storage space and inconvenience in moving and handling.

SUMMARY OF THE INVENTION

The purpose of this section is to summarize some aspects of the embodiments of the present invention and briefly introduce some preferred embodiments. Specific details may be omitted so as not to obscure the invention. However, the disclosure is written to enable one skilled in the art to practice the teachings herein without undue experimentation.

In view of the above problems in the existing prior arts, the present invention is provided.

The technical problem to be solved by the present invention is that drone swarm need to occupy a large area of ground for take-off and landing, and each drone needs to occupy a certain volume for storage, resulting in wasting of storage space and inconvenience in transportation.

To solve the above technical problems, the present invention provides the following technical solution: a stackable unmanned aerial vehicle (UAV) comprising a fuselage comprising a first end and a second end; a mating structure arranged in the fuselage and configured to have an opening at the first end of the fuselage, the mating structure forming a mating recess on a first side of the fuselage, the mating recess having an opening at the first side of the fuselage for receiving a mating projection from a further stacking unmanned aerial vehicle; wherein the mating recess is configured to taper gradually from the first end to the second end such that cross-sectional area of the first end is greater than cross-sectional area of the second end and the gradual taper simultaneously forms a mating projection having a leading end with a cross-sectional area that is narrower than a base end having a larger cross-sectional area.

As a preferable solution of the stackable UAV according to the present invention, the mating recess is configured to have a V-shaped longitudinal cross-section.

As a preferable solution of the stackable UAV according to the present invention, the fuselage further comprises a connection element extending outward from the fuselage, the connection element is configured to surround the fuselage and has a plurality of propelling blades evenly distributed around outer circumference of the fuselage.

As a preferable solution of the stackable UAV according to the present invention, the fuselage further comprises a circumferential side wall defining lateral cross-sections cut through any points from the first end to the second end of the fuselage to have circular ring shapes with respective circular outer profiles and consistent ring widths.

As a preferable solution of the stackable UAV according to the present invention, the fuselage further comprises a circumferential side wall defining lateral cross-sections cut through any points from the first end to the second end of the fuselage to have n-sided polygonal ring shapes with respective n-sided polygonal outer profiles and consistent ring widths, where n is an integer and $n \geq 3$.

As a preferable solution of the stackable UAV according to the present invention, the mating recess has a depth greater than a distance between the connection element and the leading end of the mating projection.

As a preferable solution of the stackable UAV according to the present invention, the fuselage is made of transparent material; the mating recess has a portion being proximal to the second end and the portion is arranged with one or more LED lights.

As a preferable solution of the stackable UAV according to the present invention, the fuselage is shaped as a cone, the first end being a base of the cone and mating recess M has a conical shape.

As a preferable solution of the stackable UAV according to the present invention, the connection element comprises a supporting platform and a plurality of overhanging arms distributed around outer circumference of the supporting platform; wherein the second end of the fuselage is configured to pass through the supporting platform, the propelling blades are connected to the corresponding overhanging arms.

The present invention further provides the following technical solution: a drone swarm comprising at least two unmanned aerial vehicles of claim 1, wherein a mating projection P of the $a^{th}$ stackable drone is fittable into an mating recess M of the $(a+1)^{th}$ stackable drone, where $a \geq 1$ and a is an integer.

The benefits and advantages of the present invention include: the stackable UAV do not require a large area of ground for take-off and landing. The stackable UAV requires only a small space for storage and transportation. When landing, based on the conical or pyramidal structure, the UAV may slide down by gravitational force into the mating recess of another UAV thereunder without needs of high precision positioning or alignment system. As the fuselages are made of transparent material and arranged with LED lights, there is a scattering effect on the lights emitted from the LED lights so that the drone swarm performance is more eye-catching and entertaining. Furthermore, the UAV can float on the water under special situations.

BRIEF DESCRIPTION OF THE DRAWINGS

Embodiments of the invention are described in more detail hereinafter with reference to the drawings. It will be apparent to those skilled in the art that modifications other drawings can be obtained based on these drawings without creative labor. Wherein.

DETAILED DESCRIPTION:

For better understanding of the above objectives, features and advantages of the present invention, specific embodiments of the present invention will be described in detail below in conjunction with the accompanying drawings.

In the following description, specific details are set forth in order to fully understand the present invention. It will be apparent to those skilled in the art that modifications, including additions and/or substitutions may be made without departing from the scope and spirit of the invention. The detailed description of embodiments is not intended to be exhaustive or limit the invention to the precise forms disclosed.

Moreover, the present invention is described in detail in conjunction with schematic diagrams. When describing the embodiments of the present invention in detail, for ease of explanation, the cross-sectional view showing the device structure will not be partially enlarged according to the general scale, and the schematic diagram is only for the purposes of illustration. This should not limit the scope of protection of the invention. In addition, it should be understood that practical drawings should include actual three-dimensional dimensions such as length, width and depth.

Furthermore, "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or selective embodiments mutually exclusive with other embodiments.

Embodiment 1

Figure 1:
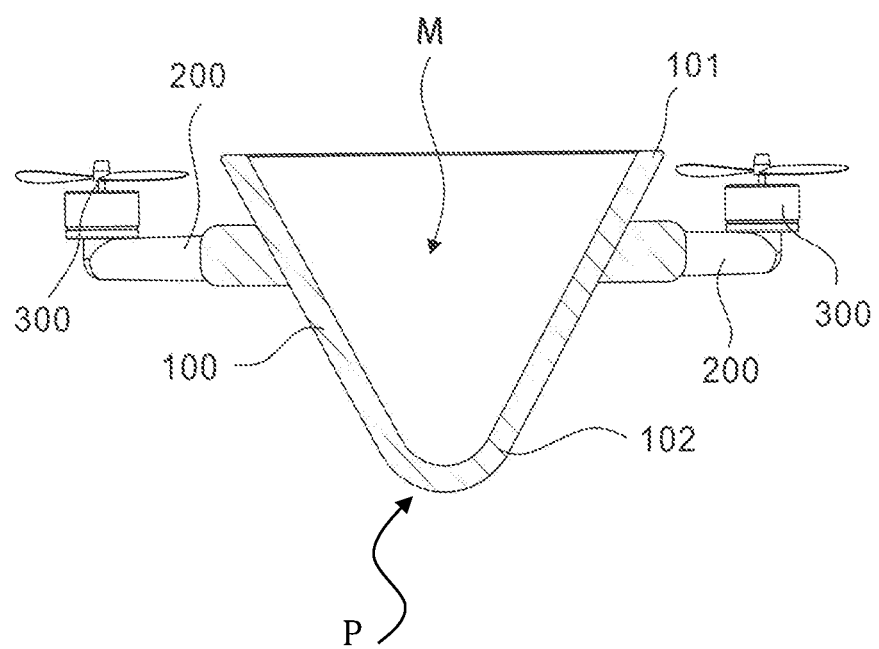
FIG. 1 is a schematic structural diagram of a stackable drone according to an embodiment provided by the invention.

Referring to FIG. 1. A stackable drone is provided in the present embodiment. The stackable drone comprises a fuselage 100. The fuselage 100 is a main body of the drone. The fuselage 100 comprises a first end 101 and a second end 102. The fuselage is configured to taper gradually from the first end 101 to the second end 102 such that cross-sectional area of the first end 101 is greater than cross-sectional area of the second end 102. Preferably, the first end 101 is an upper end of the fuselage 100, the second end 102 is a lower end of the fuselage 100. In other words, cross section of the fuselage 100 decreases gradually from the upper end to the lower end, with the second end 102 protruding downward. Furthermore, the fuselage 100 may have a housing structure (or mating structure) arranged with an accommodating groove (or mating recess) M therein. The mating recess M has an opening at the first end 101. The mating recess M has a shape in conformity with exterior contour of the fuselage 100. In other words, the mating recess M is configured to taper gradually from the first end to the second end such that cross-sectional area of the first end is greater than cross-sectional area of the second end and the gradual taper simultaneously forms a mating projection P having a projection leading end (that is, the second end 102) with a cross-sectional area that is narrower than a base end (that is, the first end 101) having a larger cross-sectional area. As such, when there are more than one drones, a mating projection P of a drone may be placed into a mating recess M of another drone thereunder such that the drones can be stacked up. Preferably, the exterior contour of the mating projection P is configured to be in conformity with contour of the mating recess M such that the drones are stackable. The stackable drones require only a small space for storage and transportation (especially in terms of horizonal area) so that convenience and effectiveness in storage and transportation can be achieved.

The fuselage 100 further comprise a connection element 200 extending outward from the fuselage 100. In the present embodiment, the connection element 200 is fixedly connected to the fuselage 100. The connection element 200 is configured to surround the fuselage 100. The connection element 200 has a plurality of propelling blades 300. The plurality of propelling blades 300 are evenly distributed around outer circumference of the fuselage 100. Preferably, the connection element 200 is arranged with 4 propelling blades 300, wherein propelling blades 300 are rotary blades.

The implementation of the present embodiment may comprise: stacking up a plurality of drones such that a mating projection P of an upper drone is placed in a mating recess M of a lower drone thereunder. During taking-off, the uppermost drone takes off firstly and is followed by the drones thereunder one by one. During landing, a firstly-landing drone is landed on a contoured cone on a landing platform, later-landing drones are landed one by one on the previously landed drones. That is, mating projections P of the later-landing drones are received by mating recesses M of the previously landed drones. As the shape of mating projection is in conformity with contour of the mating recess M, the drones can be stacked compactly together. Through the present scheme, it is no need to manually arrange and collect the drones before taking off and after landing. At the same time, the stackable structure can greatly reduce overall packing size of the drones such that it is more convenient to be transported.

Embodiment 2

Figure 2:
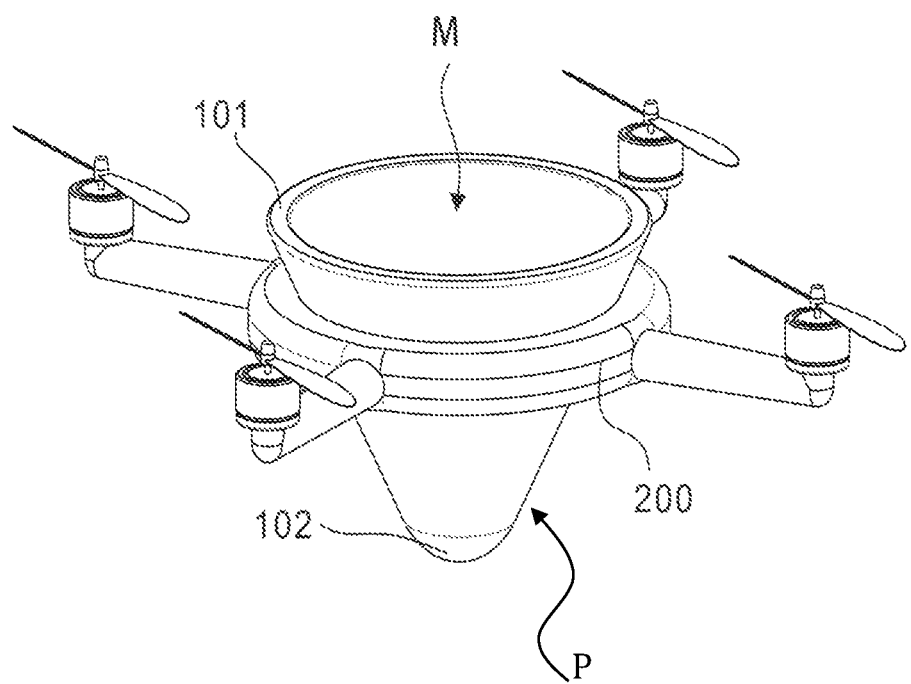
FIG. 2 is a schematic structural diagram of a stackable drone having a conical shaped fuselage according to an embodiment provided by the invention.

Referring to FIGS. 1-2. A second embodiment according to the present invention is provided. This embodiment is based on the first embodiment and different from the previous embodiment in that: preferably, longitudinal cross-section of the fuselage 100 is in V-shape. The longitudinal cross-section of corresponding mating recess M is in V-shape. As V-shaped structure is convenient to be stacked and taken out, convenience and effectiveness in storage and transportation can be achieved.

Furthermore, outer profile of any lateral cross section cut through from the first end 101 to the second end 102 of the fuselage 100 is circular, so that the fuselage 100 of the drone can be landed at any angle of orientation. Preferably, the outer contour of the fuselage 100 is shaped as a cone. The first end 101 is the base of the cone. The mating recess M is a cone-shaped groove. Conical shape is more convenient for landing and taking off than pyramid shape. The fuselage 100 further comprises a circumferential side wall defining lateral cross-sections cut through any points from the first end 101 to the second end 102 of the fuselage to have circular ring shapes with respective circular outer profiles and consistent ring widths such that the mating projection P is perfectly in conformity with the mating recess M.

Preferably, the mating recess M may have a depth greater than a vertical distance between the connection element 200 and the leading end 102 of the mating projection P. If the depth of the mating recess M is too short, the mating projection P cannot be completely fit into the mating recess M, the landing of the drone will be unstable. For stable and secured landing, the mating projection P located below the connecting element 200 should be completely fit in the mating recess M.

The implementation of the present embodiment is that: the fuselage 100 of this embodiment has a conical shape, and the mating recess M therein is also in a conical shape. Through the present scheme, it is no need to manually arrange and collect the drones before take-off and after landing. At the same time, the stackable structure can greatly reduce overall packing size of the drones such that they are more convenient to be transported. At the same time, due to the conical shape of the fuselage 100, the drone can float on the water under special situations without sinking to the bottom of the water as the conical shape provides the drone with a buoyancy.

Embodiment 3

Figure 3:
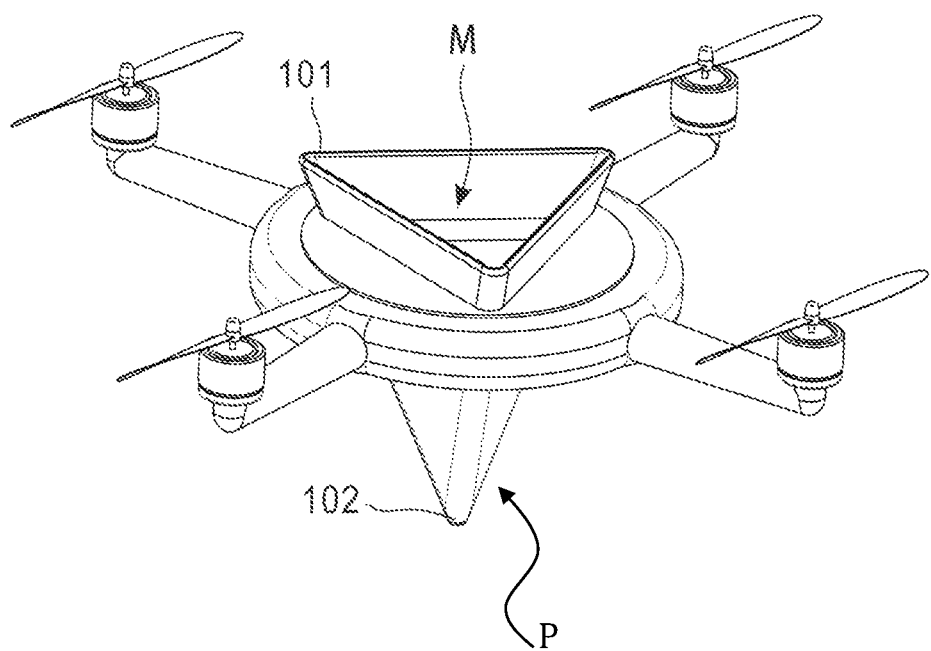
FIG. 3 is a schematic structural diagram of a stackable drone having a triangular pyramid shaped fuselage according to an embodiment provided by the invention.
Figure 4:
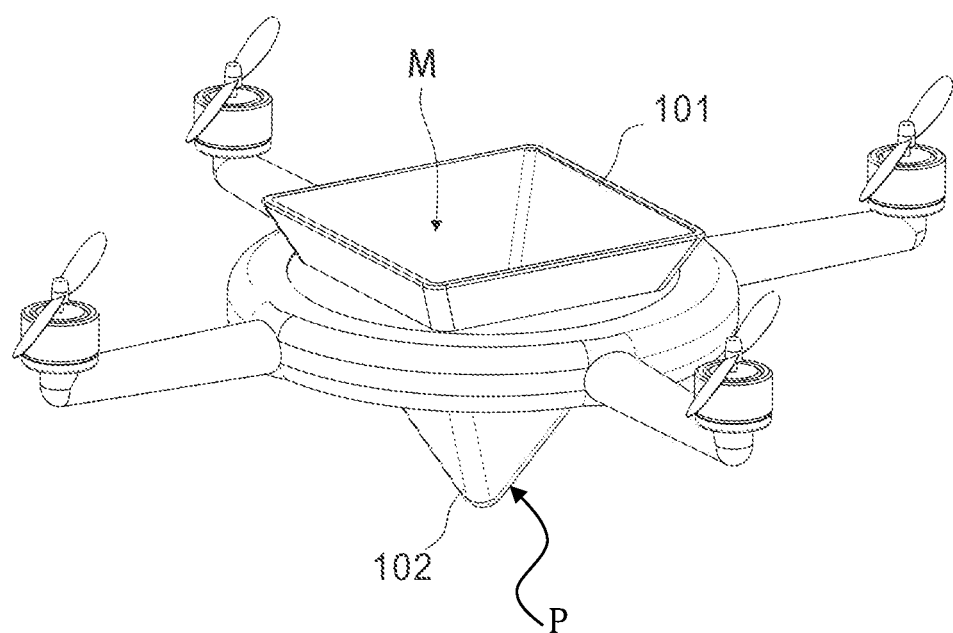
FIG. 4 is a schematic structural diagram of a stackable drone having a quadrangular pyramid shaped fuselage according to an embodiment provided by the invention.
Figure 5:
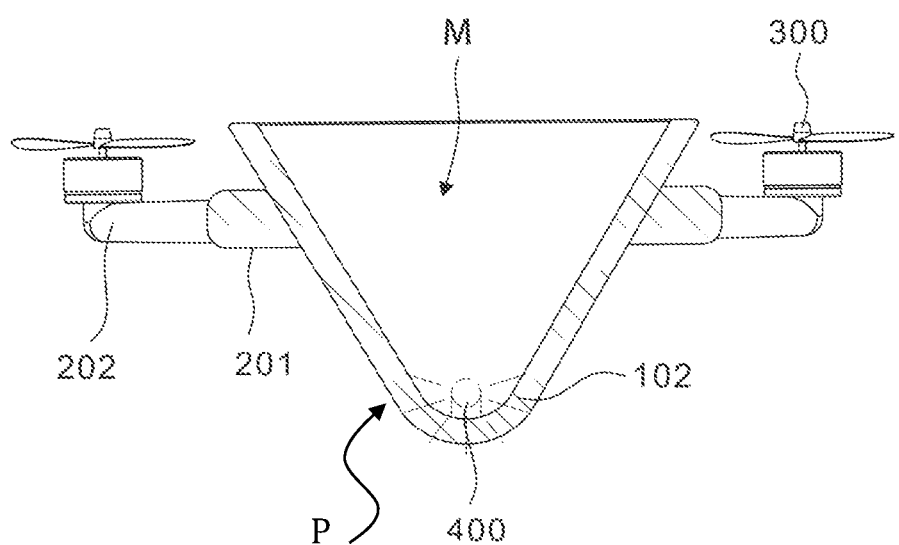
FIG. 5 is a schematic structural diagram of a stackable drone having a LED light according to an embodiment provided by the invention.
Figure 6:
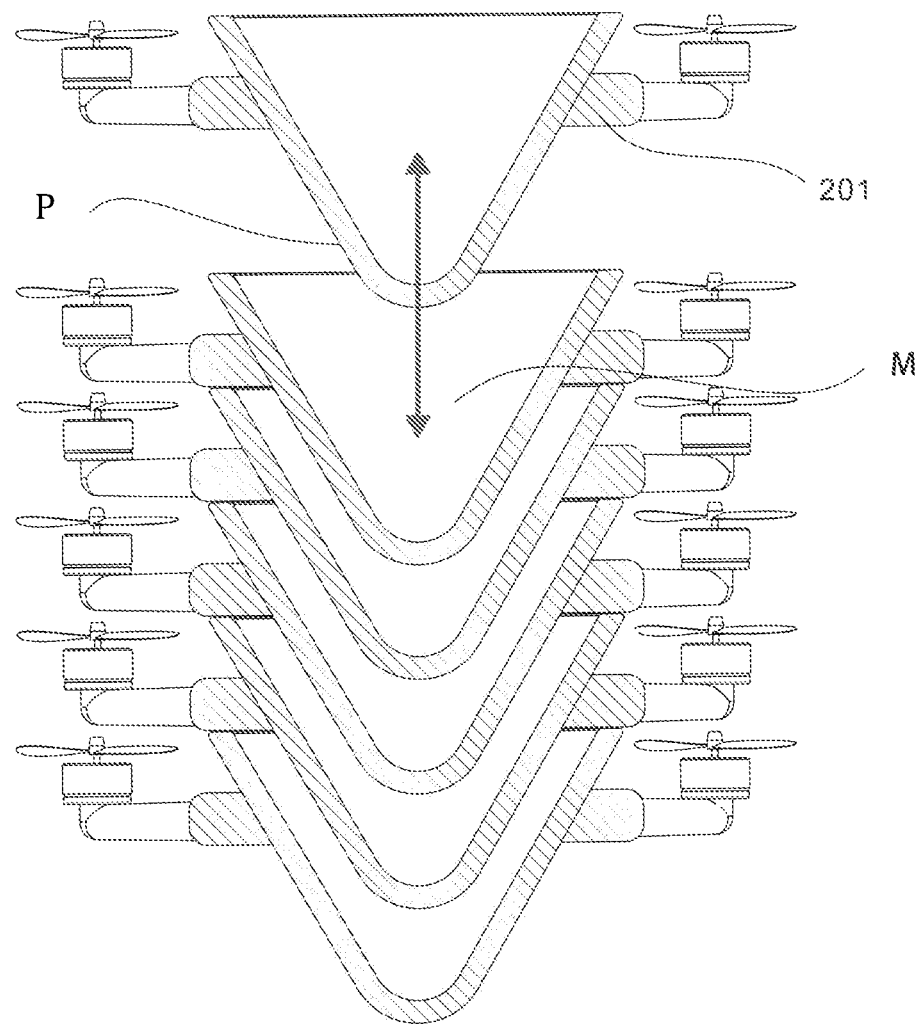
FIG. 6 is a schematic diagram showing how a group of stackable drones take off and land according to an embodiment provided by the invention.

Referring to FIGS. 3-4. A third embodiment according to the present invention is provided. This embodiment is based on the previous embodiments and different from the previous embodiments in that: preferably, the fuselage 100 has a polygonal pyramid shape. Specifically, fuselage further comprises a circumferential side wall defining lateral cross-sections cut through any points from the first end to the second end of the fuselage to have n-sided polygonal ring shapes with respective n-sided polygonal outer profiles and consistent ring widths, where n is an integer and n≥3. The shape of the fuselage 100 may be triangular pyramid, quadrangular pyramid . . . etc. Preferably, depth of the mating recess M is greater than a vertical distance between the connection element 200 and the leading end 102 of the mating projection P. If the depth of the mating recess M is too short, the mating projection cannot be completely fit into the mating recess M, the landing of the drone will be unstable. For stable and secured landing, the mating projection P located below the connecting element 200 should be completely fit in the mating recess M.

The implementation of the present embodiment is that: the fuselage 100 of the present embodiment is configured to be polygonal pyramid, such as triangular pyramid, quadrangular pyramid . . . etc. When the number of sides of the pyramid tends to infinity, the fuselage 100 will have a conical shape, and mating recess M therein also has a conical shape. Through the present scheme, it is no need to manually arrange and collect the drones before take-off and after landing. At the same time, the stackable structure can greatly reduce overall packing size of the drones such that it is more convenient to be transported.

Embodiment 4

Referring to FIGS. 1-5. A fourth embodiment according to the present invention is provided. The fourth embodiment is based on the previous embodiments and being different in that: the fuselage 100 is made of transparent materials, such as PC material, so as to achieve better light transmission effect, wherein a portion of the mating recess M proximal to the second end 102 is arranged with LED light 400.

Furthermore, in the present embodiment, a common drone rotor is used for providing aerodynamic lift force that supports the weight of the drone.

In particular, the connection element 200 comprises a supporting platform 201 and a plurality of overhanging arms distributed around outer circumference of the supporting platform 201. The second end 102 of the fuselage 100 is configured to pass through the supporting platform 201, the propelling blades 300 are connected to the corresponding overhanging arms. The propelling blades 300 are positioned away from the first end 101 such that landing and stacking of the drone swarm are not affected when the propelling blades 300 are rotating.

The implementation of the present embodiment is that: During a drone swarm performance, when taking-off, the uppermost drone takes off firstly and is followed by the drones thereunder one by one, LED lights 400 are controlled to be turned on. As the fuselages 100 are transparent and have conical or pyramid shape, there is a scattering effect on the lights emitted from the LED lights 400 so that the drone swarm performance is more eye-catching and entertaining.

Embodiment 5

Referring to FIGS. 1-6. A fifth embodiment according to the present invention is provided. The fifth embodiment is based on the previous embodiments and different in that: it provided a drone swarm comprising: at least two stackable drones, wherein a mating projection P of the $a^{th}$ stackable drone can be fitted into an mating recess M of the $(a+1)^{th}$ stackable drone, where a≥1 and a is an integer.

Each drone comprises a fuselage 100 having a first end 101 and a second end 102, constituting a downward-protruding conical structure. Each drone further comprises a mating recess M arranged in the fuselage and configured to taper gradually from the first end 101 to the second end 102 and the gradual taper simultaneously forms a mating projection P. Outer profile of the mating projection P is in conformity with contour of the mating recess M such that the drones are stackable. During taking off, rotary blades of the uppermost drone is firstly rotated such that the uppermost drone takes off firstly, according to the stacking order of the drones, from upper to lower, the drones take off one by one. During landing, a firstly-landing drone is landed on a contoured cone on a landing platform that is in conformity with the shape of the mating projection P of the drone, later-landing drones are landed one by one on the previously landed drones. As the shape of the mating projection P is in conformity with the contour of the mating recess M, the drones can be stacked compactly together. When a drone is on top of a previously landed drone (horizontal shifting tolerance of ±5 cm is allowed) and approximately 10-20 cm above the mating recess M of the previously landed drone, the propelling blades 300 of the drone is stopped from rotating, the drone is then slid down by gravitational force into the mating recess M of a drone thereunder. Even if the conical body of the drone does not completely align with the mating recess M of the drone thereunder, it would be slid into the hollow mating recess M by gravitational force such that the mating projection P of the landing drone is snuggly fit with the mating recess M of the previously-landed drone. In accordance with the above-said procedure, remaining drones land one by one on the uppermost of the stacked drones. Through the present scheme, it is no need to manually arrange and collect the drones before take-off and after landing. At the same time, the stackable structure can greatly reduce overall packing size of the drones such that it is more convenient to be transported.

It is important to note that the configuration and arrangement of the present application shown in a number of different exemplary embodiments are only exemplary. Although only a few embodiments are described in detail in this disclosure, those who refer to this disclosure should easily understand that many modifications can be made without substantially departing from the novel teachings and advantages of the subject described in this application. It is possible (for example, the size, scale, structure, shape and ratio of various elements, as well as parametric values (for example, temperature, pressure, etc.), installation arrangement, material use, color, orientation change, etc.). For example, an element shown as an integrally formed element may be composed of multiple parts or elements, the position of the element may be inverted or otherwise changed, and the nature or number or position of the discrete elements may be altered or changed. Therefore, all such modifications are intended to be included in the scope of the present invention. The order or sequence of any process or method steps may be changed or re-sequenced according to alternative embodiments. In the claims, any "means plus function" clauses are intended to cover the structure described herein to perform the function, and it is not only structurally equivalent but also equivalent in structure. Without departing from the scope of the present invention, other substitutions, modifications, changes and omissions can be made in the design, operating conditions, and layout of the exemplary embodiment. Therefore, the present invention is not limited to specific embodiments, but extends to various modifications that still fall within the scope of the appended claims.

In addition, in order to provide a concise description of the exemplary embodiment, it is not necessary to describe all the features of the actual implementation (for example, those features that are not related to the best mode currently considered for carrying out the present invention, or to implement the present invention, and those features that are irrelevant to the present invention).

It should be understood that, in the development process of any actual implementation, such as in any engineering or design project, a large number of specific implementation decisions can be made. Such development efforts may be complicated and time-consuming, but for those skilled in the art who benefit from this disclosure, overdue experimentation is not required. The development efforts will be a routine work of design, manufacturing and production.

It should be noted that the above embodiments are only used to illustrate the technical solutions of the present invention and not to be limiting. Although the present invention is described in detail with reference to the preferred embodiments, those ordinarily skilled in the art should understand that the present invention can have modification or equivalent replacement of the technical solution of the invention without departing from the spirit and scope of the technical solution of the invention shall be covered by the scope of the claims of the invention.

What is claimed is:

1. A stackable unmanned aerial vehicle, comprising:
   a fuselage comprising a first end and a second end;
   a mating structure forming a mating recess on a first side of the fuselage, the mating recess having an opening at the first side of the fuselage for receiving a mating projection from a further stacking unmanned aerial vehicle;
   wherein the mating recess is configured to taper gradually from the first end to the second end such that cross-sectional area of the first end is greater than cross-sectional area of the second end and the gradual taper simultaneously forms a mating projection having a leading end with a cross-sectional area that is narrower than a base end having a larger cross-sectional area,
   wherein the fuselage further comprises a connection element extending outward from the fuselage; and
   wherein the mating recess has a depth greater than a vertical distance between the connection element and the leading end of the mating projection.

2. The stackable unmanned aerial vehicle according to claim 1, wherein the mating recess is configured to have a V-shaped longitudinal cross-section.

3. The stackable unmanned aerial vehicle according to claim 2, wherein the connection element is configured to surround the fuselage and has a plurality of propelling blades evenly distributed around outer circumference of the fuselage.

4. The stackable unmanned aerial vehicle according to claim 3, wherein the fuselage further comprises a circumferential side wall defining lateral cross-sections cut through any points from the first end to the second end of the fuselage to have circular ring shapes with respective circular outer profiles and consistent ring widths.

5. The stackable unmanned aerial vehicle according to claim 3, wherein the fuselage further comprises a circumferential side wall defining lateral cross-sections cut through any points from the first end to the second end of the fuselage to have n-sided polygonal ring shapes with respective n-sided polygonal outer profiles and consistent ring widths, where n is an integer and n≥3.

6. The stackable unmanned aerial vehicle according to claim 1, wherein the fuselage is made of transparent material; the mating recess has a portion being proximal to the second end of the fuselage and the portion is arranged with one or more LED lights.

7. The stackable unmanned aerial vehicle according to claim 6, the fuselage is shaped as a cone, the first end being a base of the cone and mating recess M has a conical shape.

8. The stackable unmanned aerial vehicle according to claim 7, the connection element comprises a supporting platform and a plurality of overhanging arms distributed around outer circumference of the supporting platform;
 wherein the second end of the fuselage is configured to pass through the supporting platform, the propelling blades are connected to the corresponding overhanging arms.

9. A drone swarm comprising at least two unmanned aerial vehicles of claim 1, wherein a mating projection of the $a^{th}$ stackable drone is fittable into a mating recess M of the $(a+1)^{th}$ stackable drone, where $a \geq 1$ and a is an integer.

10. The drone swarm according to claim 9, wherein the mating recess of each unmanned aerial vehicle is configured to have a V-shaped longitudinal cross-section.

11. The drone swarm according to claim 9, wherein the connection element is configured to surround the fuselage and has a plurality of propelling blades evenly distributed around outer circumference of the fuselage.

12. The drone swarm according to claim 11, wherein the fuselage further comprises a circumferential side wall defining lateral cross-sections cut through any points from the first end to the second end of the fuselage to have circular ring shapes with respective circular outer profiles and consistent ring widths.

13. The drone swarm according to claim 11, wherein the fuselage further comprises a circumferential side wall defining lateral cross-sections cut through any points from the first end to the second end of the fuselage to have n-sided polygonal ring shapes with respective n-sided polygonal outer profiles and consistent ring widths, where n is an integer and $n \geq 3$.

14. The drone swarm according to claim 9, wherein the fuselage is made of transparent material; the mating recess has a portion being proximal to the second end of the fuselage and the portion is arranged with one or more LED lights.

15. The drone swarm according to claim 14, the fuselage is shaped as a cone, the first end being a base of the cone and mating recess M has a conical shape.

16. The drone swarm according to claim 15, the connection element comprises a supporting platform and a plurality of overhanging arms distributed around outer circumference of the supporting platform;
 wherein the second end of the fuselage is configured to pass through the supporting platform, the propelling blades are connected to the corresponding overhanging arms.

* * * * *